July 16, 1946.                W. M. SCHWEICKART                2,404,145
                         COUPLING FOR COAL FEEDING WORMS
                              Filed March 28, 1944

INVENTOR.
WM. M. SCHWEICKART
By E. J. Birkenbeul
ATTORNEY

Patented July 16, 1946

2,404,145

UNITED STATES PATENT OFFICE 2,404,145

COUPLING FOR COAL FEEDING WORMS

William M. Schweickart, Cleveland, Ohio

Application March 28, 1944, Serial No. 528,451

3 Claims. (Cl. 287—2)

This invention relates generally to the stoker art and particularly to a coupling for coal feeding worms, ash conveying worms and shafting.

The main object of this invention is to produce an inexpensive and efficient form of coupling for joining the sections of coal feeding worms.

The second object is to construct a coupling of the class described which can be readily attached or detached in the field.

The third object is to construct a coupling which will reduce the possibility of wear and corrosion between the contact surfaces of the associated parts.

The fourth object is to provide a coupling which will have the required strength to resist torque in both directions and end thrust in both directions and yet will occupy a minimum of space.

I accomplish these objects in the manner set forth in the following specification as illustrated in the accompanying drawing, in which.

Similar numbers of reference refer to the same or similar parts throughout the several views.

Figures 1, 2:
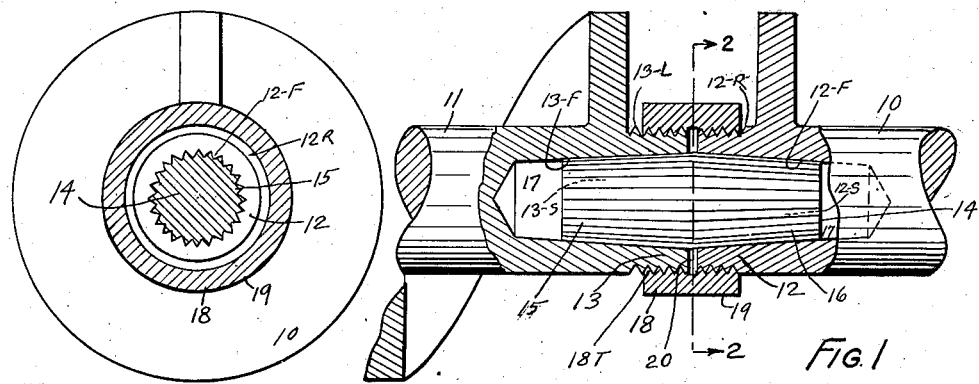
Fig. 1 is a longitudinal section through the coupling and the adjacent ends of a pair of worm sections.
Fig. 2 is a transverse section taken along the line 2—2 in Fig. 1.
Figures 4, 5:
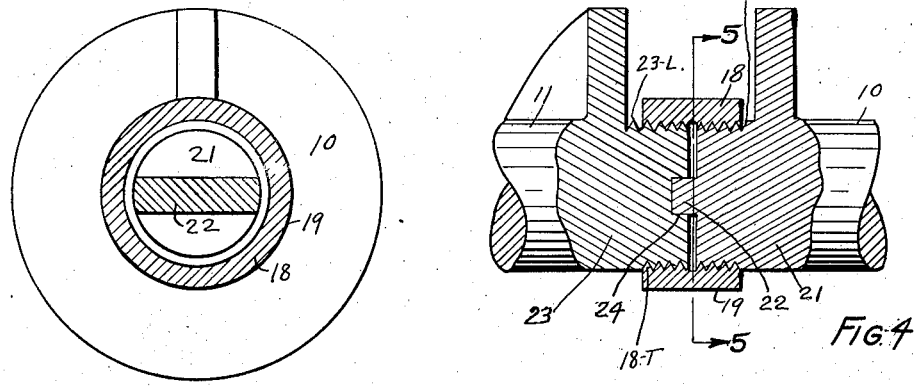
Fig. 4 is a longitudinal section through a modified form of the device.
Fig. 5 is a transverse section taken along the line 5—5 in Fig. 4.
Figure 3:
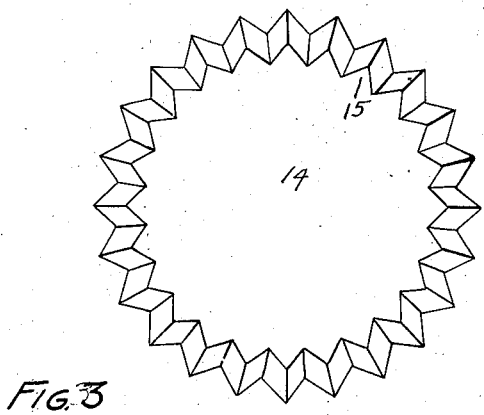
Fig. 3 is an enlarged end elevation of the plug member.

Referring in detail to the drawing, there is shown in Figs. 1 and 4 the ends 10 and 11 of a pair of coal worm sections whose projecting portions 12 and 13 are provided with right hand threads 12—R and left hand threads 13—L. The shaft ends 12 and 13 are drilled and tapered to approximately ⅛" to the inch forming the sockets 12—S and 13—S fluted along the taper with 90 degree angle flutings 12—F and 13—F. For the sake of illustration, the flutings 12—F and 13—F are not shown past the end of the plug 14.

For the purpose of illustration only, it is stated that if the maximum diameter of the taper is ¾" there would be approximately 24 flutes 12—F and 13—F formed in the circumference thereof.

Fitting into the tapered recesses is a fluted plug 14 whose flutes 15 and 16 mate with the flutes 12—F and 13—F of the tapered recesses 17. The ends 12 and 13 are joined by the reversely threaded sleeve 18 whose exterior 19 may be smooth or knurled or flattened as desired, without departing from the spirit of this invention.

When joining a pair of worm ends 10 and 11 it is desirable to coat the parts with a compound and thereby fill up all of the voids and prevent corrosion due to moisture or other corrosive elements in the material being conveyed by the worm. It will be observed that if the sleeve 18 is turned to draw the ends 10 and 11 together, the double tapered plug 14 is forcibly pressed into the openings 17 and the ends 10 and 11 are solidly united. Any excess compound will fill the space 20 between the ends 12 and 13. Obviously too great an excess would be objectionable as it would prevent a proper seating of the parts.

Should it be desired to uncouple the ends 10 and 11, it is only necessary to turn the sleeve 18 in the opposite direction with relation to the ends 10 and 11 and they will be forced apart by this action.

In the form of the device shown in Figs. 4 and 5, the worm shaft end 21 is provided with a tongue 22 and the worm shaft end 23 is provided with a slot 24 to receive the tongue 22. In this form of the device, the worm shaft ends 21 and 23 are provided with threads 21—R and 23—L which receive the right and left hand threads 18—T of the sleeve 18.

In the latter described form of the device, axial rigidity is sacrificed for a lowered manufacturing cost but the principle of the operation is identical in the two forms of the device.

It will be understood that while in Figs. 1 and 2 the pitch is not illustrated as being uniform between adjacent flights of the coupled worms, it is desirable to have them so, although it is not absolutely essential. While all the references have been directed toward the coupling of coal feeding worms, it will be appreciated that the same arrangement applies to any other form of conveying worm as well as shafting for machine parts wherein the installation and operating conditions are such as to render use of the ordinary forms of coupling undesirable.

While I have thus illustrated and described my invention, it must be understood that the proportions illustrated are only by way of example. Also the number and type of the flutes 15 and the degree of taper of the plug 14 are not critical.

I claim:

1. In a device of the class described, the combination of a pair of worm sections having their adjacent shaft ends oppositely threaded, said shaft ends having fluted, tapered recesses formed therein along the worm axis, a double tapered plug having its largest diameter knurled in the middle of its length and having flutes along its tapered surfaces adapted to mate with those in the shaft recesses and a threaded sleeve adapted to receive the threaded ends of said worm sections and draw same together upon said plug.

2. A coupling for coal feeding worms consisting of a pair of externally threaded worm shaft ends having tapered recesses formed axially in the shaft ends and fluted longitudinally, a fluted plug adapted to occupy said tapered recesses when the shaft ends are drawn together, and a threaded sleeve adapted to receive said shaft ends and draw same together while they are held against relative rotation by said fluted plug.

3. In a device of the class described, a combination of a pair of adjacent axially disposed shaft ends, each of which has a tapered recess formed therein, a tapered plug adapted to occupy both of said recesses when said shaft ends are drawn together, said plug and recesses having mating flutes formed therein adapted to selectively position said shaft ends in a rotary direction, said shaft ends being oppositely threaded and a sleeve having opposite internal threads adapted to receive the threaded shaft ends in a manner to draw the shaft ends together when said sleeve is rotated in one direction, and force same apart when the sleeve is rotated in the opposite direction.

WILLIAM M. SCHWEICKART.